US007403895B2

(12) United States Patent
Iwamoto et al.

(10) Patent No.: US 7,403,895 B2
(45) Date of Patent: Jul. 22, 2008

(54) CONTROL SYSTEM OUTPUTTING RECEIVED SPEECH WITH DISPLAY OF A PREDETERMINED EFFECT OR IMAGE CORRESPONDING TO ITS AMBIENT NOISE POWER SPECTRUM

(75) Inventors: Toru Iwamoto, Tokyo (JP); Naoya Takahashi, Inagi (JP)

(73) Assignee: Fujitsu Limited, Kawasaki (JP)

( * ) Notice: Subject to any disclaimer, the term of this patent is extended or adjusted under 35 U.S.C. 154(b) by 734 days.

(21) Appl. No.: 10/601,822

(22) Filed: Jun. 24, 2003

(65) Prior Publication Data

US 2004/0138892 A1 Jul. 15, 2004

(30) Foreign Application Priority Data

Jun. 26, 2002 (JP) ............................ 2002-186743

(51) Int. Cl.
*G10L 21/00* (2006.01)
*G10L 15/08* (2006.01)
*G10L 11/00* (2006.01)

(52) U.S. Cl. ...................... 704/228; 704/231; 704/271; 704/275

(58) Field of Classification Search ................. 704/232, 704/246, 247, 271, 275, 228, 231
See application file for complete search history.

(56) References Cited

U.S. PATENT DOCUMENTS 5,839,109 A * 11/1998 Iwamida ..................... 704/271
6,823,312 B2 * 11/2004 Mittal et al. ................ 704/271
6,839,670 B1 * 1/2005 Stammler et al. ........... 704/251
6,970,185 B2 * 11/2005 Halverson .................. 704/231
6,975,993 B1 * 12/2005 Keiller ....................... 704/275
2002/0032040 A1 3/2002 Tsukamoto

FOREIGN PATENT DOCUMENTS

GB 2 370 196 6/2002
JP 07-084592 3/1995
JP 08-097902 4/1996
JP 10-282985 10/1998
JP 2002-094614 3/2002

OTHER PUBLICATIONS

Notice of Reasons for Rejection dated mailed Oct. 10, 2006 in corresponding Japanese Patent Application No. 2002-186743.

* cited by examiner

*Primary Examiner*—Talivaldis Ivars Smits
(74) *Attorney, Agent, or Firm*—Staas & Halsey LLP

(57) ABSTRACT

A control system receiving an input signal, comprising speech with ambient noise, determines the ambient noise power spectrum, retrieves control information corresponding to the closest-matching ambient noise power spectrum, and outputs the input signal along with display of a predetermined effect or image corresponding to the ambient noise power spectrum.

15 Claims, 11 Drawing Sheets

FIG. 4

| CONDITIONS | POWER SPECTRUM (4a) | IMAGE (4b) | MUSIC (4c) | VIBRATIONS (4d) | TYPE (4e) |
|---|---|---|---|---|---|
| LIBRARY | - 80,-60,-45 ··· | tosho.jpg | — | — | IMAGE |
| SCHOOL | - 120,-100,-80 ·· | gakko.jpg | — | PATTERN 2 | IMAGE AND VIBRATIONS |
| INTERSECTION | - 10,-20,-15 ··· | — | kousa.mp 3 | — | MUSIC |
| - - - - - - - - | - - - - - - - - | - - - - - - - - | - - - - - - - - | - - - - - - - - | - - - - - - - - |

FIG. 11

| | 4a | | | | 4b | 4c | 4d | 4e |
|---|---|---|---|---|---|---|---|---|
| CONDITIONS | POWER SPECTRUM | TIME | POSITION | BRIGHT-NESS | IMAGE | MUSIC | VIBRATIONS | TYPE |
| LIBRARY | - 80,-60,-45 ··· | 9:00~17:00 | 35' 41' , 139' 52' | 80 lux | tosho.jpg | — | — | IMAGE |
| SCHOOL | - 120,-100,-80 ·· | 7:00~17:00 | 35' 42' , 138' 48' | 100 lux | gakko.jpg | — | PATTERN 2 | IMAGE AND VIBRATIONS |
| INTERSECTION | - 10,-20,-15 ··· | 12:00~13:00 | 34' 39' , 137' 35' | 150 lux | — | kousa.mp 3 | — | MUSIC |
| ⋮ | ⋮ | ⋮ | ⋮ | ⋮ | ⋮ | ⋮ | ⋮ | ⋮ |

CONTROL SYSTEM OUTPUTTING RECEIVED SPEECH WITH DISPLAY OF A PREDETERMINED EFFECT OR IMAGE CORRESPONDING TO ITS AMBIENT NOISE POWER SPECTRUM

BACKGROUND OF THE INVENTION

The present invention relates to a control system for executing control of displaying an image and reproducing a piece of music corresponding to a sound such as an ambient sound, and so on.

There has hitherto been a case of desiring to know, when talking by a mobile phone, an ambient condition of a speaker as the other party such as detecting whether the other speaker might feel embarrassed talking as in a train, a library etc.

There is, however, little ambient information conveyed from a voice, and it is difficult to exactly grasp the ambient condition.

Further, in the case of giving a call through IP (Internet Protocol) telephony and performing a voice chat between personal computers, an arbitrary image and a music file are transmitted to the other party for the communications. This scheme is, however, no more than transmitting the data specified by the user each time, and is incapable of objectively judging the user's ambient condition.

SUMMARY OF THE INVENTION

It is a primary object of the present invention, which was devised in view of the problems inherent in the prior art, to provide a function capable of executing control of displaying an image and reproducing a piece of music corresponding to a received sound.

To accomplish the above object, according to one aspect of the present invention, a control system includes a sound input unit receiving an input of a voice, an analyzing unit obtaining a characteristic of the sound received by the sound input unit, by analyzing the sound, a control information storage unit by storing therein a control information corresponding to the characteristic of the sound, a retrieving unit retrieving from the control information storage unit, the control information corresponding to the characteristic of the sound, an output unit outputting a predetermined effect, and a control unit controlling the output unit based on the control information retrieved by the retrieving unit.

The predetermined effect may be at least one of operations performed based on predetermined functions such as displaying an image, reproducing a piece of music and giving a notice by vibrations.

The characteristic of the sound may be a power spectrum.

The control system according to the present invention may further include a specifying unit specifying, when the sound input unit receives a sound for a speech, an ambient sound contained in the received sound, and wherein the retrieving unit may retrieve out the control information corresponding to the ambient sound specified by the specifying unit.

The control system according to the present invention may further include a detection unit detecting an auxiliary information to be used for the retrieve, and wherein the control information storage unit may be stores therein the sound characteristic, the auxiliary information and the control information in a way that corresponds the sound characteristic and the auxiliary information to the control information, and the retrieving unit may be retrieves from the control information storage unit, the control information corresponding to the sound characteristic and the auxiliary information.

Note that the auxiliary information is defined as a time, a position, brightness and so on.

The control system according to the present invention may further include a speaking state detection unit detecting, when the sound input unit receives the sound for a speech, a speaking period and a non-speaking period.

According to another aspect of the present invention, a storage medium readable by a machine, tangible embodying a program of instructions executable by the machine to perform method steps comprising, obtaining a characteristic of an inputted sound by analyzing the sound, retrieving from a control information storage unit, a control information corresponding to the characteristic of the sound, and executing the control so as to output a predetermined effect on the basis of the retrieved control information.

Herein, the readable-by-computer storage medium includes storage mediums capable of storing information such as data, programs, etc. electrically, magnetically, optically and mechanically or by chemical action, which can be all read by the computer. What is demountable out of the computer among those storage mediums may be, e.g., a flexible disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type storage mediums within the computer.

With the architecture described above, according to the present invention, a grasp of an ambient condition of even what is hard to recognize simply by hearing a sound can be facilitated by displaying a specific image an reproducing a piece of music.

Moreover, according to the present invention, when applied to a field of, e.g., entertainment, a picture suited to the ambient condition can be appeared interesting on the basis of the received sound.

Note that the sound according to the present invention is defined as a sound representing the ambient condition such as a human voice, TV and radio sounds, voices (crying) of animals, a traveling sound of a train, a sound of a siren and so forth. Further, the sound is not limited to an audible frequency band and may include sounds having frequency bands receivable by a sound input unit such as a high frequency contained in a sound of a car engine, and a low frequency of a haul of wind.

Further, according to the present invention, the ambient sound is a sound emitted from the environment where the voice is inputted, and includes naturally hearable sounds irrespective of whether to be aware of or not, such as chatting voices around, exhaust noises of vehicles coming and going, chirping of insects in tranquility in the night, typing sounds of keys of the personal computer in the office, and so on.

BRIEF DESCRIPTION OF THE DRAWINGS

The foregoing and other features and advantages of the present invention will become more readily appreciated as the same becomes better understood by reference to the following detailed description when taken in conjunction with the accompanying drawings wherein:

FIG. 4 is an explanatory diagram showing a table stored with power spectrums and pieces of control information;

FIG. 11 is an explanatory diagram showing a table stored with power spectrums and pieces of auxiliary information in a way that maps them to each other.

DETAILED DESCRIPTION OF THE PREFERRED EMBODIMENTS

Embodiment 1

A mobile phone as a control system according to an embodiment 1 of the present invention will hereinafter be described with reference to FIGS. 1 through 9.

§1. Whole Architecture

Figure 1:
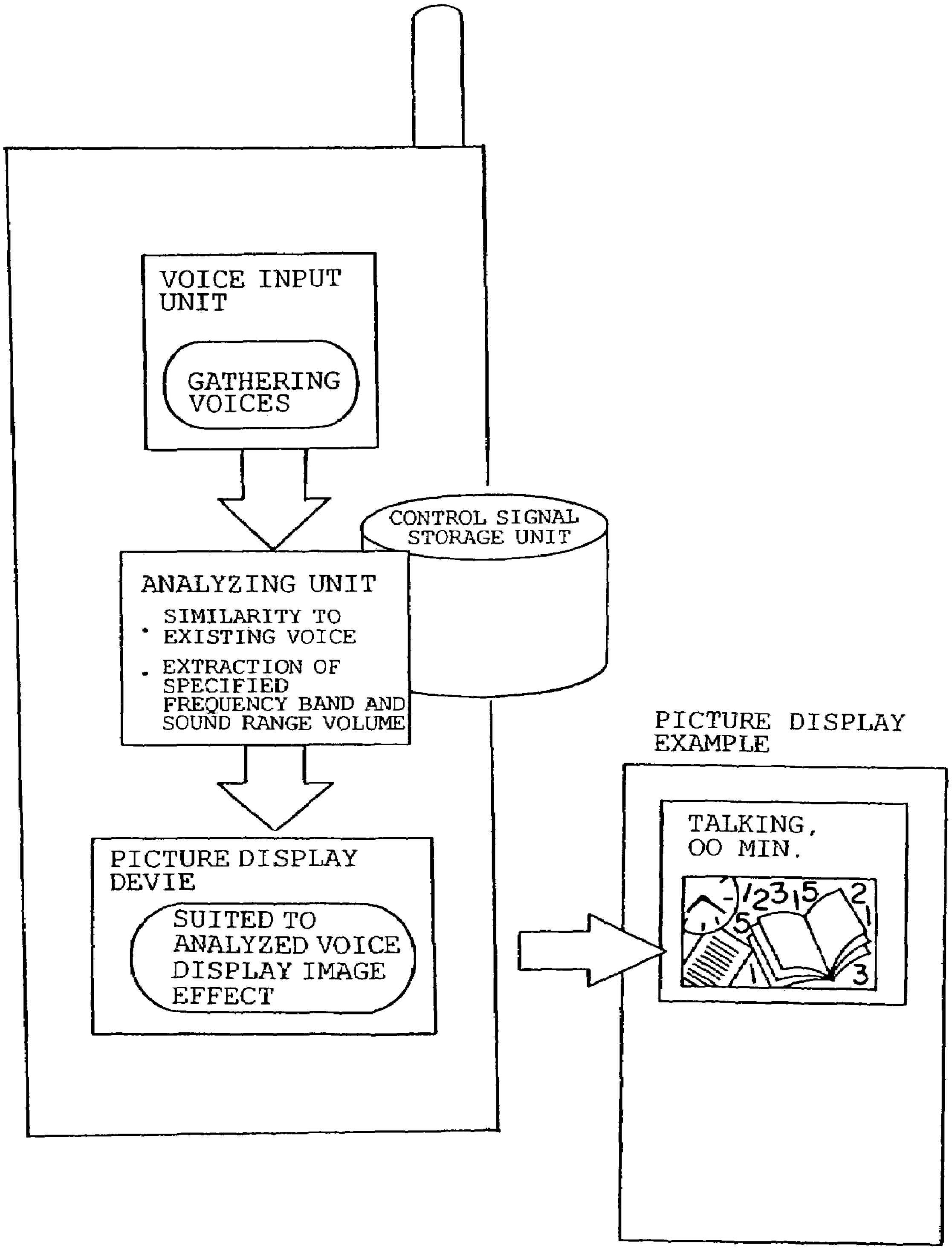
FIG. 1 is a conceptual diagram showing a mobile phone as a control system in an embodiment 1.

FIG. 1 is a conceptual view showing the mobile phone as the control system in the embodiment 1.

At first, a sound input unit receives a voice, and next an analyzing unit acquires a power spectrum of the received voice. The voice herein is defined as a sound according to the present invention, and includes a voice of a speaker, an ambient sound emitted from the environment and other general sounds. Then, a retrieving unit compares the power spectrum with existing power spectrums stored in a control information storage unit, and judges from a similarity, a sound volume in a specified frequency band etc whether or not the target power spectrum matches with one of the existing power spectrums. The retrieving unit retrieves control information corresponding to the power spectrum judged to be matched. Then, a control unit, based on this item of control information, controls an output unit such as displaying a predetermined image on an imaged is play device (display unit), reproducing a music and a message, and so on.

The mobile phone in the embodiment 1 is thus constructed so as to be capable of expressing an ambient state hard to recognize only through the voice by the image and by music, and of thus facilitating a grasp of the state of where the user himself or herself or the speaker as the other party exists.

§2. Architecture of Mobile Phone

Next, respective components configuring the mobile phone in the embodiment 1 will be explained.

Figure 2:
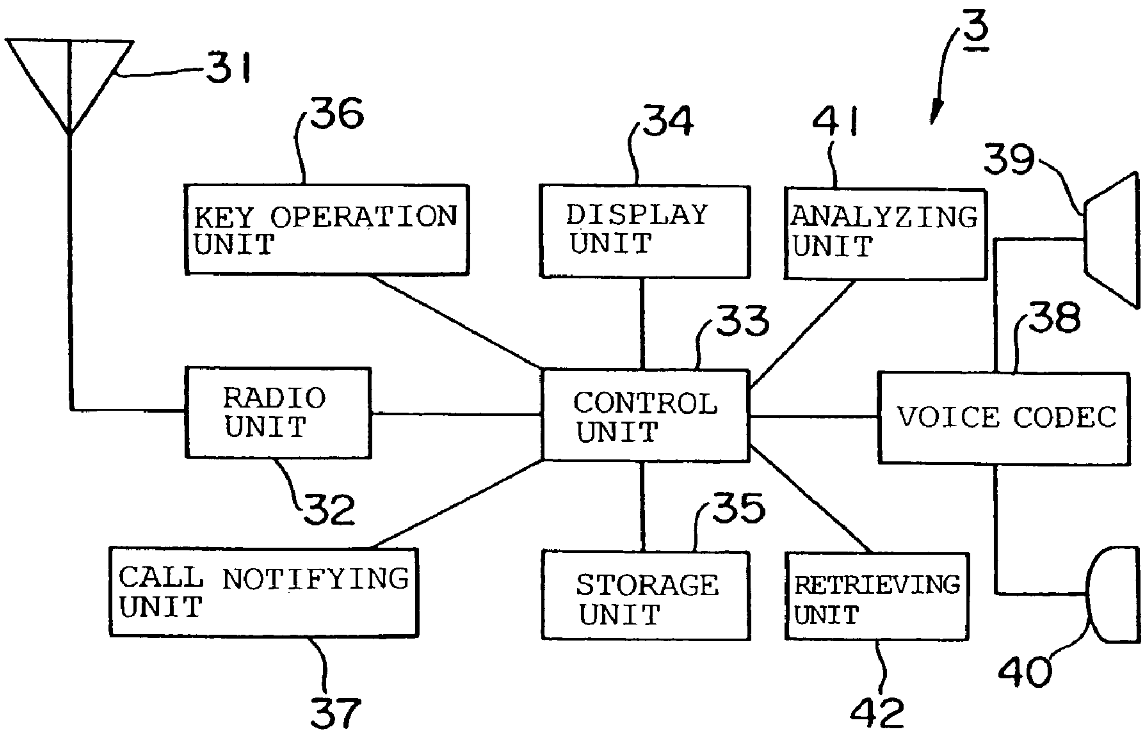
FIG. 2 is a block diagram showing a mobile phone 3 of the present invention.

FIG. 2 is a block diagram showing a mobile phone 3 according to the present invention.

The mobile phone 3 in the embodiment 1 includes an antenna 31 for transmitting and receiving radio waves for performing communications with a radio base station (unillustrated), a radio UNIT 32 for generating receipt data by demodulating the radio waves received by the antenna 31, and outputting modulation signals to the antenna 31 in a way that modulates transmission data into a predetermined frequency, a control UNIT (control unit) 33 for executing control such as decoding the demodulation signals generated by the radio UNIT 32 and enabling the communications by outputting the encoded transmission data to the radio UNIT 32, and a display unit 34, constructed of, e.g., an LCD (Light Emitting Diode), for displaying the information under the control of the control unit 33.

The mobile phone 3 further includes a storage unit (control information storage unit) 35 stored with telephone number data, an application program and pieces of control information corresponded the power spectrums of the voices that will be described later on, a key operation unit 36. The mobile phone 3 still further includes a call notifying UNIT 37 for notifying the user of a call by a music and vibrations, a voice codec (sound input unit) 38 for receiving the voice data decoded by the control UNIT 33, decoding the voice data in specifications of a voice encoding system, thereafter executing an analog conversion thereof, outputting the voice data as voice signals to the voice output unit 39, then encoding, after converting the inputted voice signals into digital signals, the same signals into voice data in the specifications of the voice encoding system, and outputting the voice data to the control UNIT 33. The mobile phone 3 yet further includes a voice output unit 39, constructed of a loudspeaker and an amplifier, for outputting the voice signals, and an input unit 40 constructed of, e.g., a microphone.

Moreover, the mobile phone 3 has an ANALYZING UNIT (analyzing circuit) 41 for obtaining the voice signals outputted from the voice codec via the control UNIT 33 and acquiring the power spectrum of the voice signals by analyzing the voice signals, and a retrieving unit 42 for retrieving the control information corresponded to this power spectrum from within the storage unit 35.

Figure 3:
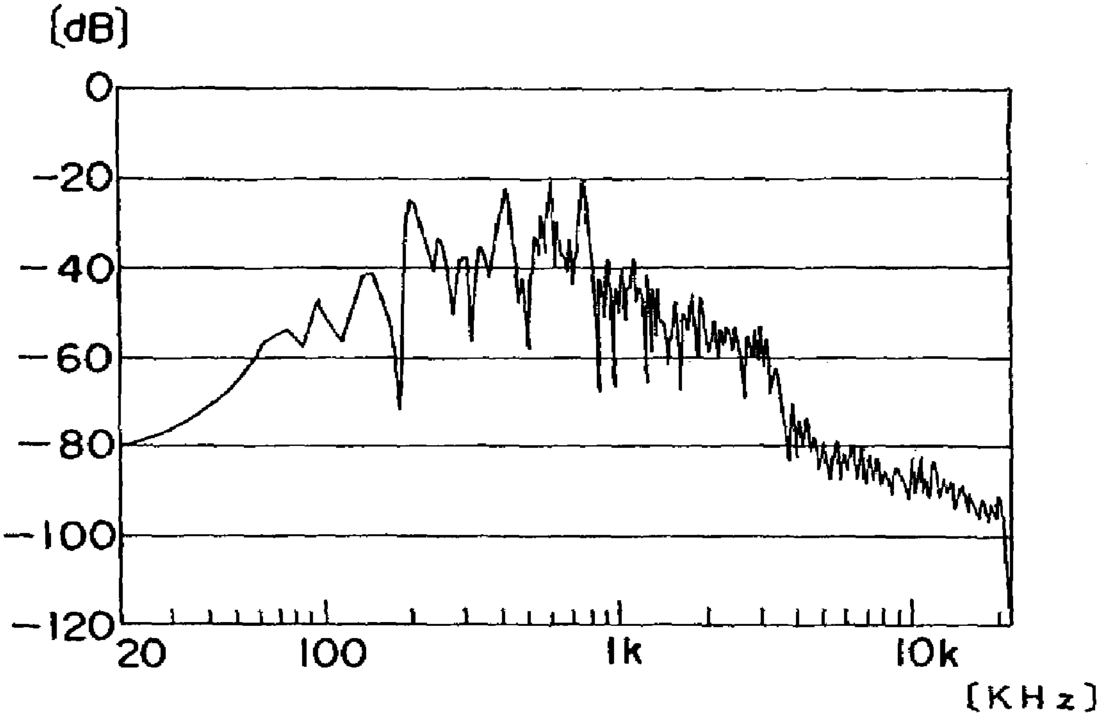
FIG. 3 is an explanatory diagram showing a power spectrum.

The ANALYZING UNIT 41 obtains, as shown in, e.g., FIG. 3, the power spectrum of the sound (voice signal) to be analyzed, i.e., a sound pressure level per frequency. This power spectrum may be what is acquired at a certain moment of the analysis target sound and also what fluctuates within a predetermined period of time.

The storage unit 35 is stored with the power spectrums of voices in a variety of conditions such as in a train, a library, a pub (or bar) etc that are likewise obtained beforehand by the ANALYZING UNIT 41, and with pieces of control information in a way that maps them with each other.

FIG. 4 is an explanatory diagram showing a table showing the power spectrums and the control information. As shown in FIG. 4, a power spectrum field 4*a* is stored with numerical values of the power spectrums under the respective conditions. An image filed 4*b*, a music field 4*c*, a vibration field 4*d* and a type field 4*e* are stored with pieces of control information corresponding to the power spectrums. The fields, 4*b*, 4*c* and 4*d* are stored with an image file, a music file and a vibration file. Further, the field 4*e* is stored with a control type. The control type indicates, when the power spectrum matches, which field the data to be used are stored in.

The retrieving unit 42 retrieves out, from within the storage unit 35, the control information corresponding to the matched power spectrum among the power spectrums obtained by the ANALYZING UNIT 41.

In this case, the retrieving unit 42 judges whether the power spectrum matches or not in a way that, as written in, e.g., Handbook of Electronic Information Communications (published by Ohm Co., Ltd.), obtains a spectral distance scale of the power spectrum, and judges that the power spectrum matches when the distance is equal to or smaller than a predetermined threshold value and that the power spectrum does not match when larger than the threshold value. Further, a probability model of each power spectrum is obtained, and it is judged whether the respective probability models come to have an approximate relationship. Note that other matching methods may be utilized without being limited to the method described above.

It is also to be noted that the display unit 34 and the call notifying UNIT 37 are categorized as an output unit for displaying he image, reproducing the music and giving a notice by vibrations under the control of the control UNIT 33.

§3. Control Procedure

Figure 5:
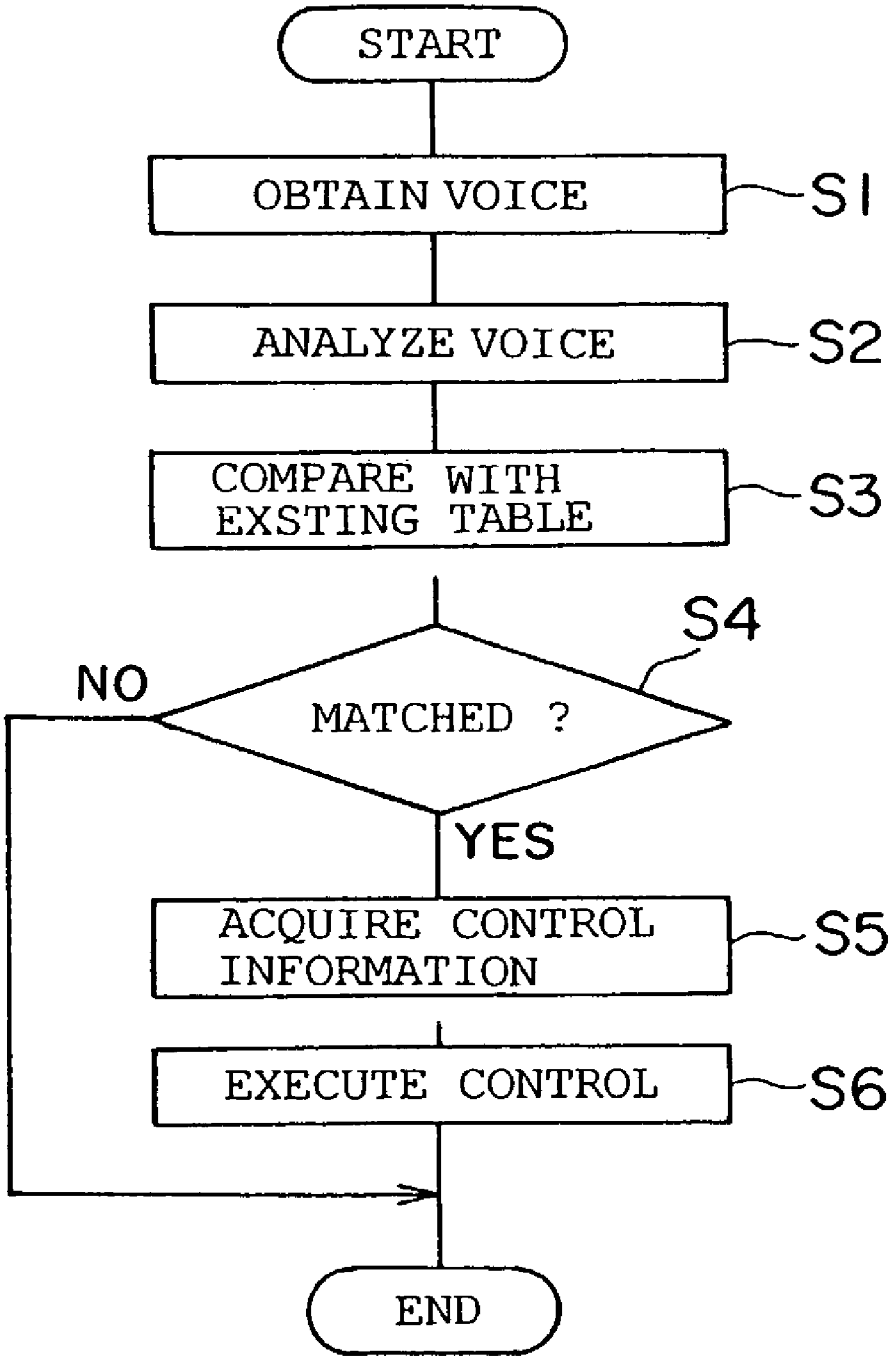
FIG. 5 is an explanatory diagram showing a control procedure for displaying an image corresponding a voice.

FIG. 5 is an explanatory diagram showing a control procedure of displaying an image corresponding to a voice in the embodiment 1.

When telephoning a callee as the other speaker by an operation of a caller himself or herself, or if a talk starts in response to calling from the other speaker, the voice codec 38 of the mobile phone 3 obtains the voice signal from the other speaker (step 1 which will hereinafter be abbreviated to S1).

Next, the ANALYZING UNIT 41 of the mobile phone 3 acquires a power spectrum by analyzing the voice obtained in S1 (S2).

Subsequently, the retrieving unit 42 retrieves the storage unit 35 in order to compare the existing power spectrums stored therein with the power spectrum obtained in S2 (S3).

The retrieving unit 42 judges whether or not the obtained power spectrum matches with one of the existing power spectrums (S4). If none of these power spectrums are matched, the retrieving unit 42 terminates the process and, whereas if matched, acquires the control information corresponding to the matched power spectrum (S5).

Then, in the case of obtaining the control information, the control UNIT 33 controls, based on the same control information, the display unit 34 or the call notifying UNIT 37 so as to display an image and reproduce apiece of music or give a notice by vibrations (S6). FIG. 1 shows an example where the other speaker exists in a library.

Figure 6:
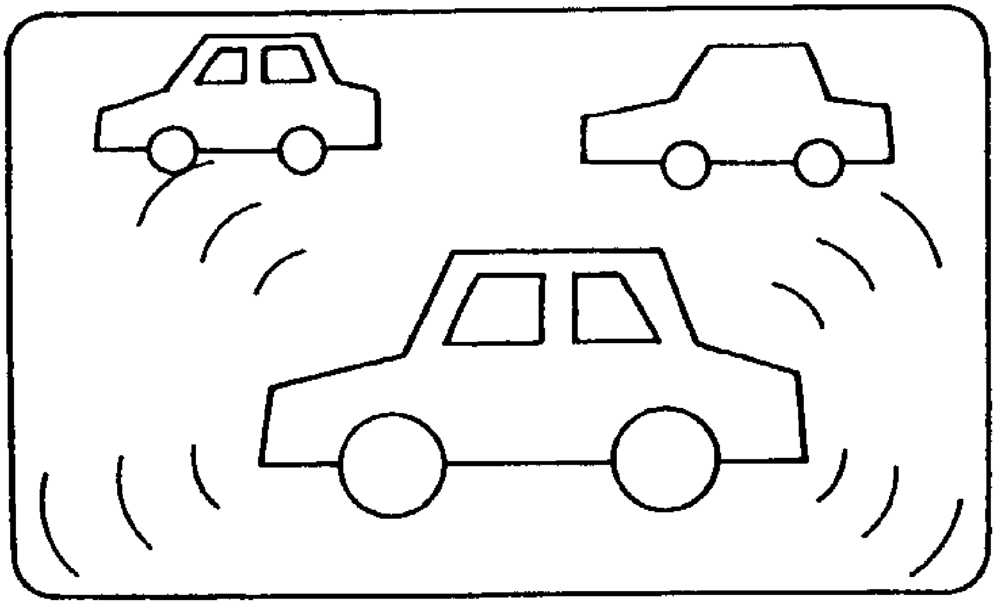
FIG. 6 is an explanatory diagram showing related images representing a high traffic density.

Thus, the related image can be displayed corresponding to the voice (ambient sound), and it is therefore possible to, when talking outdoors where there is, for example, heavy traffic, display a related image expressing a high traffic density and indicating that it is hard to talk due to the noisy ambient sounds as illustrated in FIG. 6

It is also feasible to display where the other speaker exists, whether in a school, a library, a park, a department store, a tearoom etc, and the state of the other speaker can be thus easily grasped.

Moreover, it is possible to actualize such a scheme of emitting, when arriving at the school, an alarm sound and giving a notice of switching off a power supply.

Modified Example 1

Figure 7:
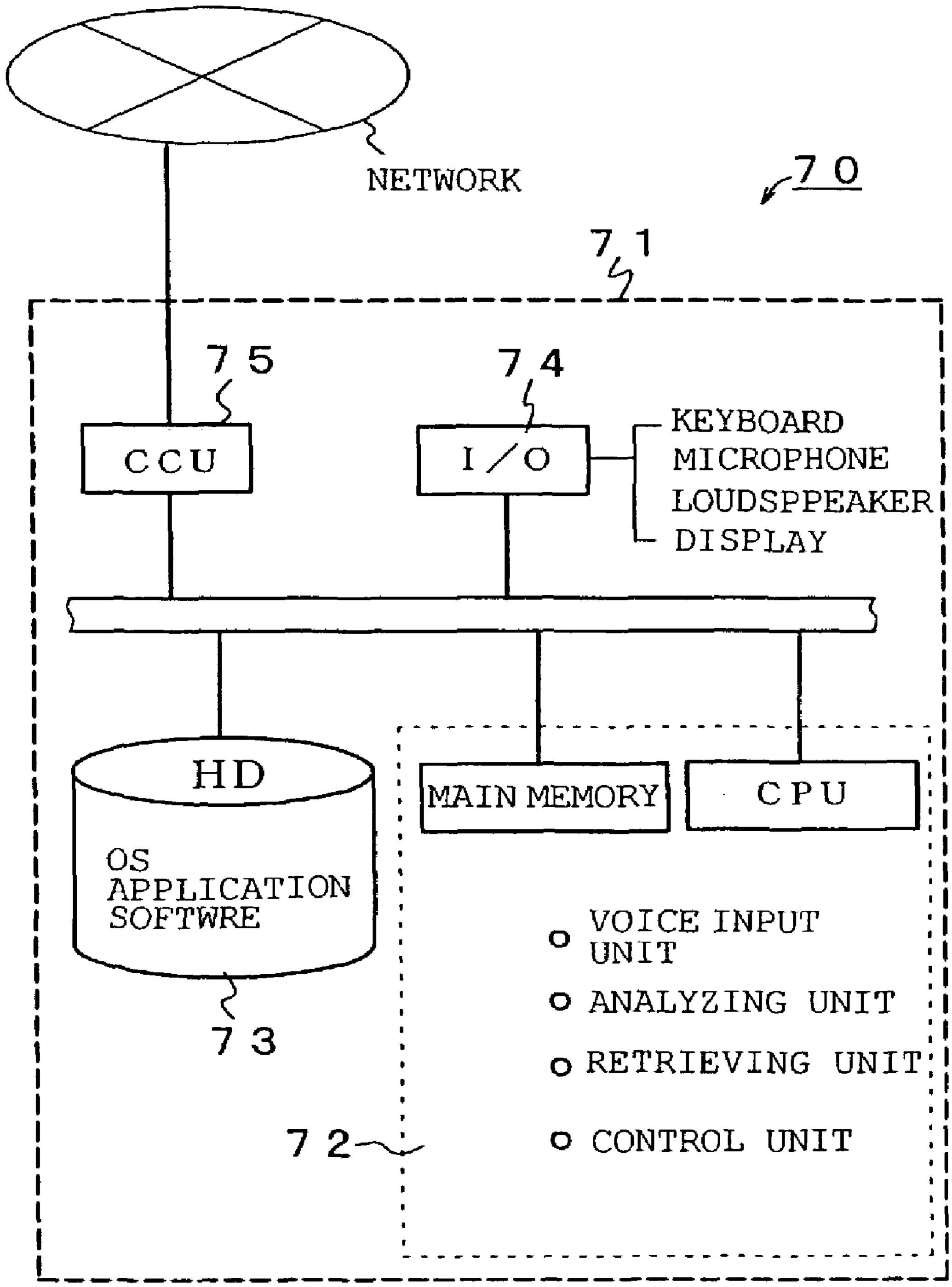
FIG. 7 is a block diagram showing a case of using a computer.

FIG. 7 shows an example of utilizing a computer such as the PDA etc by way of a modified example of the embodiment 1.

A computer 70 has, as shown in FIG. 7, a main body 71 incorporating an arithmetic processing unit 72 constructed of a CPU (Central Processing Unit) and a main memory, a storage unit (hard disk) 73 stored with software for arithmetic processing, an I/O port 74 as an input/output unit for the data thereof, and a communication control unit (CCU) 75 such as a modem, a TA (Terminal Adapter), network card etc each connecting to a network and controlling the communications with other computers.

The storage unit (control information storage unit) 73 is installed with an operating system (OS) and application software (a control program and so on). The storage unit 73 is provided inside with a table that shows corresponding to between power spectrums and pieces of control information in a variety of conditions.

Input devices such as a keyboard, a microphone etc and output devices such as a display, a loudspeaker etc, are connected to the I/O port 74.

The arithmetic-processing unit 72 actualizes functions of a sound input unit, an analyzing unit, a retrieving unit, a control unit etc through processing based on information given from peripheral devices and the application software.

Note that the functions of the units described above are the same as those in the embodiment 1 discussed above, and hence their repetitive explanations are omitted.

The sound input unit of the computer 70, based on the control program, as shown in FIG. 5, obtains the voice signals from the other speaker (S1).

Next, the analyzing unit of the computer 70 analyzes the voice obtained in S1 and acquires a spectrum (S2).

Subsequently, the retrieving unit retrieves the storage unit 73 in order to compare the existing power spectrums stored therein with the power spectrum obtained in S2(S3).

The retrieving unit judges whether or not the obtained power spectrum matches with one of the existing power spectrums (S4). If none of these power spectrums are matched, the retrieving unit terminates the process and, whereas if matched, acquires the control information corresponding to the matched power spectrum (S5).

Then, when obtaining the control information, the image is displayed on the display unit or the music is reproduced from the loudspeaker on the basis of the control information under the control of the control unit (S6).

Thus, the general-purpose computer executed the control program, thereby obtaining the same effect as that in the embodiment 1.

Modified Example 2

Figure 8:
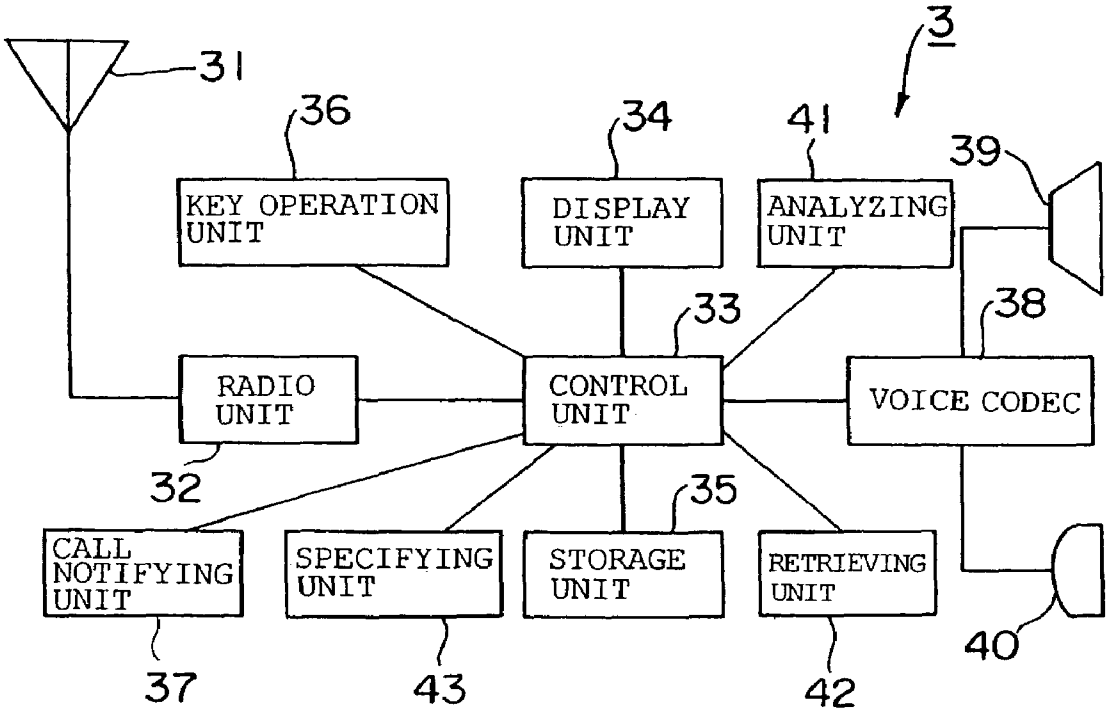
FIG. 8 is an explanatory diagram showing an example of providing an ambient sound specifying unit.

FIG. 8 shows an example of providing a unit for specifying an ambient sound. Note that a modified example 2 has substantially the same architecture as the embodiment 1 illustrated in FIG. 1 has, except that the specifying unit 43 is used.

The specifying unit 43 is stored with the power spectrums of the voices uttered towards a receiver, and specifies, as a power spectrum of the ambient sound, a sound element that is not matched with the power spectrum of the voice uttered by the speaker toward the receiver among the power spectrums of the voices received by the sound input unit.

Then, a control signal corresponding to this specified power spectrum of the ambient sound is retrieved, and the control is executed based on the control signal.

Processing steps in the modified example 2 will be explained referring to FIG. 5. To start with, when telephoning a callee as the other speaker by an operation of a caller, or if a talk starts in response to calling from the other speaker, the voice codec 38 of the mobile phone 3 obtains the voice signal from a receiver (an input unit 40) (step 1 which will hereinafter be abbreviated to S1). Namely, according to the modified example 2, the processing target is not the voice of the other speaker but the voice (including the ambient sound) of the user of the mobile phone 3.

Next, the ANALYZING UNIT 41 of the mobile phone 3 acquires a power spectrum of the voice (including the ambient sound) inputted to the receiver by analyzing the voice obtained in S1 and also a power spectrum of the voice of the speaker by retrieving the storage unit 35, and specifies, as an ambient sound power spectrum, a sound element unmatched with the power spectrum of the speaker in the obtained power spectrum of the inputted voice (S2).

Subsequently, the retrieving unit 42 retrieves the storage unit 35 in order to compare the existing power spectrums stored therein with the ambient sound power spectrum obtained in S2(S3).

The retrieving unit 42 judges whether or not the ambient sound power spectrum matches with one of the existing power spectrums (S4). If none of these power spectrums are matched, the retrieving unit 42 terminates the process and, whereas if matched, acquires the control information corresponding to the matched power spectrum (S5).

Then, in the case of obtaining the control information, the control UNIT 33 controls, based on the same control information, the display unit 34 or the call notifying UNIT 37 so as to display an image and reproduce a piece of music or give a notice by vibrations (S6).

The control is thus conducted with respect to only the ambient sound, and the ambient condition can be grasped at a high accuracy.

Note that the specifying unit 43 judges, if the speaker's voice power spectrum is not contained in the speech, it to be non-speaking period fur the duration of containing the power spectrum of the speaker's voice uttered toward the receiver among the voice power spectrums received by the sound input unit, and may specify, as an ambient sound, the voice received by the sound input unit during the non-speaking period.

In the case of thus detecting from the ambient sound that the speech is conducted outdoors where, e.g., there is the heavy traffic, the system is capable of notifying the user of the device (the mobile phone) that it is difficult to have a talk due to the noisy ambient sound.

Further, the system can be utilized for detecting from the ambient sound that the user of the device exists in a place that should switch off the power supply of the device as in a school, a library, a hospital and an airplane, and in a place that should retrain an output level of the calling sound when the call arrives, and for prompting the user to perform the device settings suited to where the user exists in a way that outputs an alarm sound and gives a notice by vibrations.

Note that the modified example given above has exemplified how the processing steps are executed during the speaking period, however, the above processing steps may be executed for a processing target ambient sound inputted during the non-speaking period as in the standby status, or during the non-using period of the device (that is the mobile phone in this example) including the control system of the present invention. With this scheme, the user can be prompted to the device settings suited to where the user exists.

Modified Example 3

In the embodiment 1 shown in FIG. 1, the voice codec (the sound input unit) 38 may receive, as an input for grasping the condition, the voice inputted from the input unit 40, analyze the power spectrum, retrieve out the control information corresponding to the same power spectrum, and perform the control based on the sound ambient to the user himself or herself.

Figure 9:
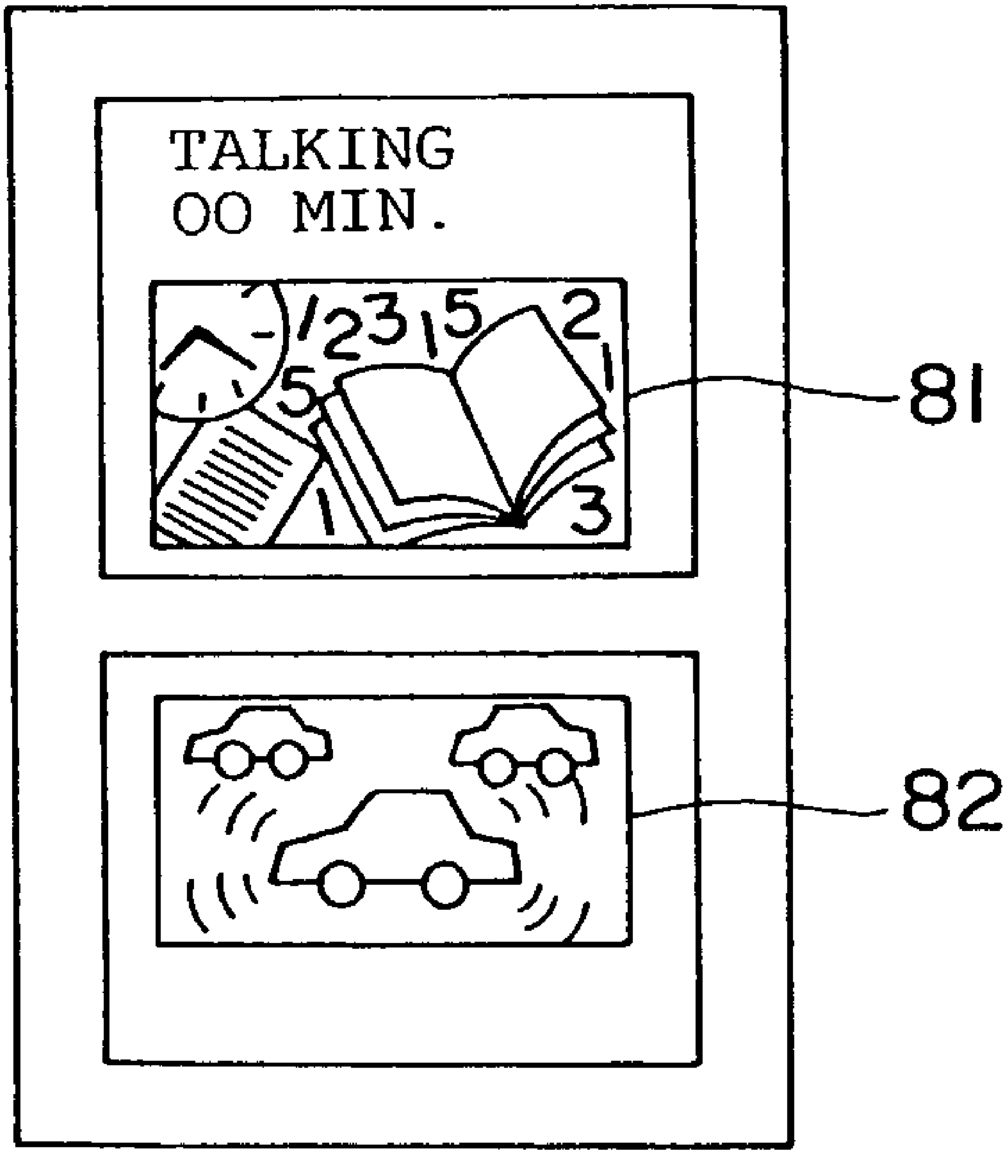
FIG. 9 is a diagram showing an example of simultaneously displaying a condition of a speaker as the other party and a condition of a speaker himself or herself.

FIG. 9 shows an example of simultaneously displaying an image 81 representing what situation the other speaker is and an image 82 representing what situation the user himself or herself is in this case.

Processing steps in a modified example 3 will be explained referring to FIG. 5. To begin with, when telephoning a callee as the other speaker by an operation of a caller, or if a talk starts in response to calling from the other speaker, the voice codec 38 of the mobile phone 3 obtains the voice signal from a receiver (an input unit 40) or from the other speaker (S1). Namely, according to the modified example 3, the processing targets are the voice of the other speaker and the voice (including the ambient sound) of the user of the mobile phone 3.

Next, the ANALYZING UNIT 41 of the mobile phone 3 acquires a power spectrum of the voice (including the ambient sound) inputted to the receiver by analyzing the voice obtained in S1 and also a power spectrum of the voice of the speaker by retrieving the storage unit 35, and specifies, as an ambient sound power spectrum, a sound element unmatched with the power spectrum of the speaker in the obtained power spectrum of the inputted voice (S2).

Subsequently, the retrieving unit 42 retrieves the storage unit 35 in order to compare the existing power spectrums stored therein with the ambient sound power spectrum obtained in S2(S3).

The retrieving unit 42 judges whether or not the ambient sound power spectrum matches with one of the existing power spectrums (S4). If none of these power spectrums are matched, the retrieving unit 42 terminates the process and, whereas if matched, acquires the control information corresponding the matched power spectrum (S5).

Then, in the case of obtaining the control information, the control UNIT 33 controls, based on the same control information, the display unit 34 or the call notifying UNIT 37 so as to display an image and reproduce a piece of music or give a notice by vibrations (S6).

Note that the control UNIT 33 judges whether or not a speech button (for starting a speech) of the key operation unit 36 is pressed, thereby judging whether it is the speaking period or the non-speaking period, and there may be displayed the situation of the user himself or herself for the non-speaking period, i.e., before dialing and the situation of the other speaker during the speaking period. This scheme enables the user to visually check whether the conditions of the noises ambient to the user are suited to the talk before starting the speech.

In this modified example 3, as a matter of course, the recognition of the situation (environment) of the other speaker can be actualized simply by changing a part of the processing steps explained in the modified example 1, and the recognition of the condition of the noises ambient to the user himself or herself can be actualized simply by changing apart of the processing steps explained in the modified example 2.

Embodiment 2

An architecture of an embodiment 2 is substantially the same as the embodiment 1, except that there is provided a detection unit for detecting pieces of auxiliary information about a time, a position, brightness and so on. Note that the same components are marked with the same numerals, and the repetitive explanations are omitted.

Figure 10:
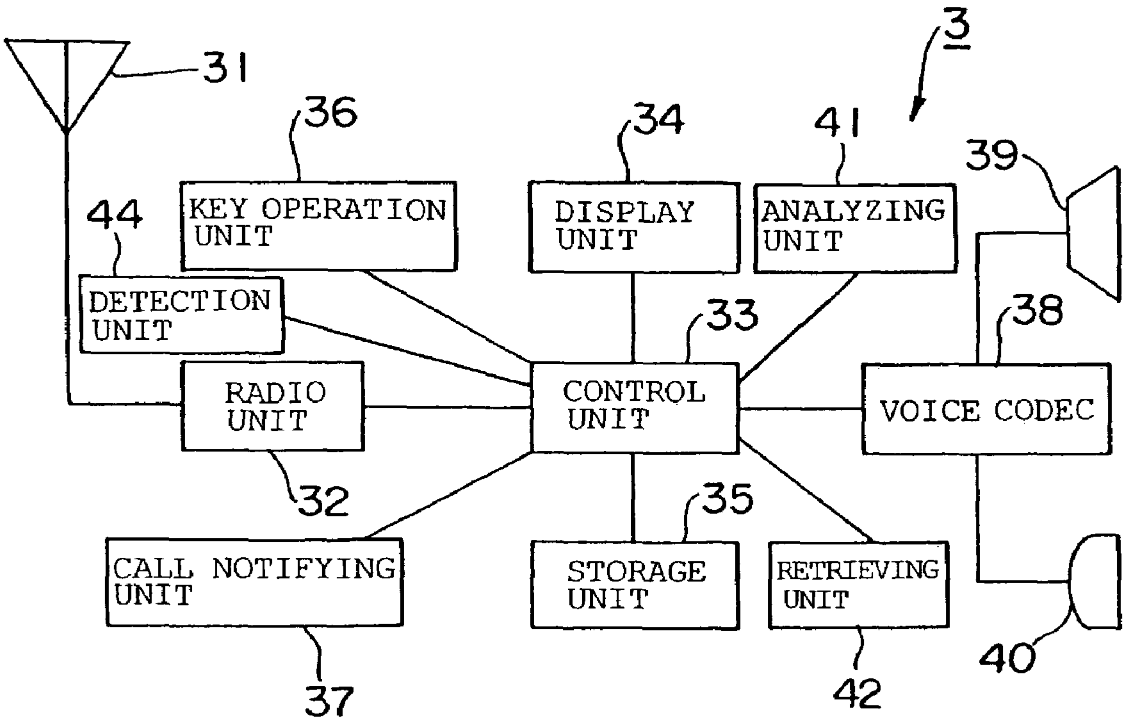
FIG. 10 is a schematic diagram showing the mobile phone 3 in an embodiment 2.

FIG. 10 is a schematic diagram of the mobile phone 3 in the embodiment 2.

The detection unit 44 detects and outputs the auxiliary information about the time, the position, the brightness etc to the control UNIT 3.

Further, the storage unit 35 is stored with the power spectrums and the pieces of auxiliary information in a way that makes them corresponding to each other.

Then, the retrieving unit 42 compares the power spectrum of the voice received by the sound input unit and the auxiliary information with the power spectrums and the auxiliary information stored in the storage unit 35, and retrieves out control information corresponding to the matched power spectrum and auxiliary information.

The control UNIT 33 controls the display unit 34 or the call notifying UNIT 37 on the basis of the control information.

Processing steps in the embodiment 2 will be described referring to FIG. 5. To begin with, when telephoning a callee as the other speaker by an operation of a caller, or if a talk starts in response to calling from the other speaker, the voice codec 38 of the mobile phone 3 obtains the voice signal from the other speaker (step 1 which will hereinafter be abbreviated to S1).

Next, the ANALYZING UNIT 41 of the mobile phone 3 acquires a power spectrum by analyzing the voice obtained in S1 (S2).

Subsequently, the retrieving unit 42 retrieves out the power spectrum obtained in S2 and the auxiliary information detected by the detection unit 44 from within the storage unit 35, and compares them with the power spectrums and pieces of auxiliary information stored therein (S3).

The retrieving unit 42 judges whether or not the power spectrum and the auxiliary information match with those stored therein (S4). If none of these power spectrums and these pieces of auxiliary information are matched, the retrieving unit 42 terminates the process and, whereas if matched, acquires the control information corresponding to thereto (S5).

Then, in the case of obtaining the control information, the control UNIT 33 controls, based on the same control information, the display unit 34 or the call notifying UNIT 37 so as to display an image and reproduce a piece of music or give a notice by vibrations (S6).

As described above, according to the embodiment 2, the situation is judged from the power spectrum and the auxiliary information in combination and can be therefore grasped at a high accuracy.

For example, as for a voice even at the same intersection, the traffic density changes depending on the time such as early in the morning, daytime, midnight etc, and hence matching between the time and the power spectrum is executed.

Further, the brightness is used as the auxiliary information, and it is therefore possible to distinguish between indoor and outdoor, and precisely distinguish between a tearoom and a park even in the case of the power spectrum of the voice having the same tone.

Moreover, even when obtaining the power spectrum in an indoor areas as quiet as in, e.g., the school, the library etc, the condition thereof can be precisely judged from the positional information thereof by retrieving facilities vicinal to that position by using the positional information as the auxiliary information.

Modified Example

Note that the function of the embodiment 2 discussed above may be embodied by the computer such as the PDA etc as in the modified example 1 of the embodiment 1.

Although only a few embodiments of the present invention have been described in detail above, those skilled in the art will readily appreciate that many modifications are possible in the preferred embodiments without departing from the novel teachings and advantages of this invention. Accordingly, all such modifications are intended to be included within the scope of the present invention as defined by the following claims.

What is claimed is:

1. A control system controlling audio and visual output, comprising:

a sound input unit receiving an input sound including a voice sound and an ambient sound;

an analyzing unit obtaining a power spectrum of the sound received by the sound input unit, by analyzing said sound;

a control information storage unit storing therein a control information corresponding to the power spectrum of the sound;

a specifying unit specifying, as a characteristic of the ambient sound, a sound element that is not matched with the power spectrum of the voice among the power spectrum of the sound;

a retrieving unit retrieving from the control information storage unit, the control information corresponding to the power spectrum of the ambient sound;

an output unit outputting a predetermined effect;

a control unit controlling the output unit based on the control information retrieved by the retrieving unit; and wherein the predetermined effect is displayed while the voice sound is output.

2. A control system according to claim 1, wherein the predetermined effect is at least one of operations performed based on predetermined functions such as displaying an image, reproducing a piece of music and giving a notice by vibrations.

3. A control system according to claim 1, further comprising:

a detection unit detecting an auxiliary information to be used for the retrieve, and wherein the control information storage unit stores therein the sound power spectrum, the auxiliary information and the control information in a way that corresponds the sound characteristic and the auxiliary information to the control information, and the retrieving unit retrieves from the control information storage unit, the control information corresponding to the sound power spectrum and the auxiliary information.

4. A control system according to claim 1, further comprising:

a speaking state detection unit detecting, when the sound input unit receives the sound for a speech, a speaking period and a non-speaking period.

5. A control system according to claim 1, wherein the sound input unit receives a sound transmitted from a device of the other party via a communication network.

6. A control system according to claim 1, wherein the sound input unit receives a sound transmitted to a device of the other party via the communication network.

7. A control system according to claim 1, wherein the sound input unit receives a sound during the non-using period of the device including the control system.

8. A storage medium readable by a computer, storing a program of instructions executable by the computer to perform method steps comprising:

receiving an input sound including a voice sound and an ambient sound;

analyzing the input sound obtain a power spectrum of the ambient sound;

matching the power spectrum of the received ambient sound with an existing power spectrum;

obtaining a predetermined image representative of the existing power spectrum; and displaying the predetermined image while outputting the voice sound.

9. A storage medium readable by a computer, storing a program according to claim 8, wherein the predetermined image is at least one of operations performed based on predetermined functions such as displaying an image, reproducing a piece of music and giving a notice by vibrations.

10. A storage medium readable by a computer, storing a program according to claim 8, further comprising:

detecting an auxiliary information to be used for the retrieve, and wherein the retrieve of the control information involves retrieving a control information corresponding to the sound power spectrum and to the auxiliary information.

11. A storage medium readable by a computer, storing a program according to claim 8, further comprising:

detecting the inputted sound being the speech sound, and a speaking period and a non-speaking period from the speech sound.

12. A storage medium readable by a computer, storing a program according to claim 8, wherein a sound received from a device of the other party via a communication network, is set as the inputted sound.

13. A storage medium readable by a computer, storing a program according to claim 8, wherein a sound transmitted from a device of the other party via a communication network, is set as the inputted sound.

14. A storage medium readable by a computer, storing a program according to claim 8, further comprising:

receiving a sound during a non-using period of the computer.

15. A method of controlling audio and visual output, comprising:

receiving an input sound including a voice sound and an ambient sound;

analyzing the input sound to obtain a power spectrum of the ambient sound;

matching the power spectrum of the received ambient sound with an existing power spectrum;

obtaining a predetermined image representative of the existing power spectrum; and displaying the predetermined image while outputting the voice sound.

* * * * *

UNITED STATES PATENT AND TRADEMARK OFFICE

CERTIFICATE OF CORRECTION

PATENT NO. : 7,403,895 B2
APPLICATION NO. : 10/601822
DATED : July 22, 2008
INVENTOR(S) : Toru Iwamoto et al.

It is certified that error appears in the above-identified patent and that said Letters Patent is hereby corrected as shown below:

Column 10, Line 62, before “obtain” insert --to--.

Signed and Sealed this

Eighteenth Day of November, 2008

JON W. DUDAS
*Director of the United States Patent and Trademark Office*